(12) United States Patent
Daniel (10) Patent No.: US 12,514,582 B2
(45) Date of Patent: Jan. 6, 2026

(54) COMPONENTS FOR USE IN COMBINATION EXTERNAL FIXATION AND NEGATIVE PRESSURE WOUND THERAPY SYSTEM AND METHODS OF PRODUCTION AND USE THEREOF

(71) Applicant: DePuy Synthes Products, Inc., Raynham, MA (US)

(72) Inventor: Steffan Daniel, Zuchwil (CH)

(73) Assignee: DePuy Synthes Products, Inc., Raynham, MA (US)

( * ) Notice: Subject to any disclaimer, the term of this patent is extended or adjusted under 35 U.S.C. 154(b) by 1446 days.

(21) Appl. No.: 16/794,862

(22) Filed: Feb. 19, 2020

(65) Prior Publication Data

US 2021/0251627 A1  Aug. 19, 2021

(51) Int. Cl.
| | |
|---|---|
| *A61B 17/60* | (2006.01) |
| *A61B 17/08* | (2006.01) |
| *A61F 13/05* | (2024.01) |
| *A61M 1/00* | (2006.01) |

(52) U.S. Cl.
CPC ............ *A61B 17/085* (2013.01); *A61B 17/60* (2013.01); *A61F 13/05* (2024.01); *A61M 1/912* (2021.05)

(58) Field of Classification Search
CPC ..... A61B 17/60–666; A61B 17/08–085; A61F 13/05; A61M 1/90–985; A61M 1/912–913
See application file for complete search history.

(56) References Cited

U.S. PATENT DOCUMENTS

| | | | | |
|---|---|---|---|---|
| 4,360,012 | A | * | 11/1982 | McHarrie .......... A61B 17/6441 606/54 |
| 4,757,809 | A | * | 7/1988 | Koeneman ........... A61B 17/645 248/316.2 |
| 4,761,860 | A | * | 8/1988 | Krauss ..................... A43C 5/00 24/713.6 |
| 5,762,640 | A | * | 6/1998 | Kajiwara ............. A61B 5/4261 604/289 |
| 7,931,651 | B2 | | 4/2011 | Webb et al. |
| 8,454,603 | B2 | | 6/2013 | Webb et al. |
| 8,523,859 | B2 | | 9/2013 | Sample et al. |
| 9,050,136 | B2 | | 6/2015 | Webb et al. |
| 9,566,089 | B2 | | 2/2017 | Webb et al. |
| 9,919,133 | B1 | * | 3/2018 | Al-Terki ............... A61M 1/984 |
| 2008/0033377 | A1 | * | 2/2008 | Kauth ................... A61F 13/143 604/304 |

(Continued)

FOREIGN PATENT DOCUMENTS

NL    1006443 C2    1/1999

OTHER PUBLICATIONS

International Search Report, mailed Apr. 6, 2021, in PCT/IB2021/050628, filed Jan. 27, 2021.

(Continued)

*Primary Examiner* — Jacqueline T Johanas
*Assistant Examiner* — Steven J Cotroneo
(74) *Attorney, Agent, or Firm* — Dunlap Codding, P.C.

(57) ABSTRACT

Devices for use with combined external fixation and negative pressure wound therapy systems are disclosed. These devices include a clamping grommet for disposal about a percutaneous device and a wound dressing. Systems and kits including these devices, as well as methods of production and use thereof, are also disclosed.

19 Claims, 6 Drawing Sheets

(56) References Cited

U.S. PATENT DOCUMENTS

| | | | | |
|---|---|---|---|---|
| 2008/0281324 A1* | 11/2008 | Webb | .................... | A61B 17/60 |
| | | | | 128/898 |
| 2009/0014375 A1* | 1/2009 | Savage | ............. | B01D 46/2414 |
| | | | | 210/238 |
| 2010/0298827 A1* | 11/2010 | Cremer | ............. | A61B 17/6466 |
| | | | | 606/54 |
| 2012/0046582 A1* | 2/2012 | Hopman | ............ | A61B 17/1327 |
| | | | | 602/5 |
| 2012/0089142 A1* | 4/2012 | Mullaney | ........... | A61B 17/6466 |
| | | | | 606/54 |
| 2013/0023842 A1* | 1/2013 | Song | ....................... | A61M 1/90 |
| | | | | 604/319 |
| 2013/0331823 A1* | 12/2013 | Askem | .................... | A61M 1/82 |
| | | | | 417/44.1 |
| 2014/0171920 A1* | 6/2014 | Smith | ................... | A61M 1/912 |
| | | | | 604/540 |
| 2016/0095626 A1* | 4/2016 | Sanders | ............. | A61B 17/6458 |
| | | | | 606/59 |
| 2016/0095756 A1* | 4/2016 | Zurovcik | ............... | A61B 50/30 |
| | | | | 604/319 |
| 2016/0256665 A1* | 9/2016 | Doshi | ........................ | A61F 5/08 |
| 2017/0043067 A1 | 2/2017 | Schneider | | |
| 2018/0078686 A1 | 3/2018 | Proctor, Jr. et al. | | |
| 2018/0289870 A1* | 10/2018 | Beasley | ................ | H01H 35/38 |
| 2018/0318477 A1* | 11/2018 | Eksteen | ................. | A61M 1/85 |

OTHER PUBLICATIONS

Written Opinion of the International Searching Authority, mailed Apr. 6, 2021, in PCT/IB2021/050628, filed Jan. 27, 2021.

\* cited by examiner

FIG. 14

COMPONENTS FOR USE IN COMBINATION EXTERNAL FIXATION AND NEGATIVE PRESSURE WOUND THERAPY SYSTEM AND METHODS OF PRODUCTION AND USE THEREOF

CROSS REFERENCE TO RELATED APPLICATIONS/INCORPORATION BY REFERENCE STATEMENT

Not Applicable.

STATEMENT REGARDING FEDERALLY SPONSORED RESEARCH OR DEVELOPMENT

Not Applicable.

BACKGROUND

Negative pressure wound therapy (NPWT) is widely utilized for treating large traumatic wounds. The treatment of open or chronic wounds that are too large to spontaneously close (or otherwise fail to heal) by means of applying negative pressure to the site of the wound commonly involves placing a cover that is impermeable or semi-permeable to fluids over the wound, using various means to seal the cover to the tissue of the patient surrounding the wound, and connecting a source of negative pressure (such as a vacuum pump) to the cover; in this manner, an area of negative pressure is created and maintained under the cover in the area of the wound. Negative-pressure wound therapy can provide a number of benefits, including migration of epithelial and subcutaneous tissues, improved blood flow, and micro-deformation of tissue at a wound site. Together, these benefits can increase development of granulation tissue and reduce healing times.

Percutaneous devices, such as (but not limited to) pins, screws, and wires, are commonly used in orthopedic procedures to stabilize and/or correct fractures, injuries, and defects. Particular examples of percutaneous devices include (but are not limited to) skeletal traction pins, percutaneous fracture pinning, and external fixation devices. However, tension is created in the skin adjacent to the percutaneous devices at the insertion sites thereof, and this tension can decrease blood supply and lead to necrosis of the surrounding tissue, thus acting as a 'magnet' for infection at the insertion site.

For example, external fixation of bone fractures commonly involves the long-term use of orthopedic pins inserted into the bone fragments and fixed to an external structure. The pins stress the skin around them during bone distraction and/or healing (or simply in response to patient movement), often leading to the cutting or tearing of pin tracts in the skin, along with the subsequent infection associated therewith. Indeed, one study reported site infection as the most common complication of external fixation, with an 11.3% to 100% infection rate in the study group (Kazmers et al., (2016) *Strat Traum Limb Recon,* 11:75-85). In addition, the risk of pin tract infection increases with time; the longer an external fixation pin remains in place, the higher the risk of infection and the more severe the infections become.

There are many instances where a patient's treatment protocol requires the combination of both negative pressure wound therapy with the placement of percutaneous/external fixation devices. However, the use of these two therapies simultaneously is particularly difficult and time consuming, because the percutaneous devices used for external fixation interfere with maintaining a seal on the negative pressure wound therapy system, thereby resulting in poor adhesion and subsequent air leakage and thus decreasing the effectiveness of the negative pressure wound therapy.

Therefore, there is a need in the art for new and improved devices and methods of producing and using same in a combination external fixation-negative pressure wound therapy system. It is to such devices, as well as methods of producing and using same, that the present disclosure is directed.

DETAILED DESCRIPTION

Before explaining at least one embodiment of the present disclosure in detail by way of exemplary language and results, it is to be understood that the present disclosure is not limited in its application to the details of construction and the arrangement of the components set forth in the following description. The present disclosure is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the present disclosure shall have the meanings that are commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references that are cited and discussed throughout the present specification. The nomenclatures utilized in connection with, and the medical procedures and techniques of, surgery, anesthesia, wound healing, and infectious control described herein are those well-known and commonly used in the art. Standard techniques are used for infection diagnostic and therapeutic applications.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles, compositions, kits, and/or methods disclosed herein can be made and executed without undue experimentation in light of the present disclosure. While the articles, compositions, kits, and/or methods have been described in terms of particular embodiments, it will be apparent to those of skill in the art that variations may be applied to the articles, compositions, kits, and/or methods and in the steps or in the sequence of steps of the methods described herein without departing from the concept, spirit, and scope of the present disclosure. All such similar substitutions and modifications apparent to those skilled in the art are deemed to be within the spirit, scope, and concept of the present disclosure as defined by the appended claims.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z.

The use of ordinal number terminology (i.e., "first," "second," "third," "fourth," etc.) is solely for the purpose of differentiating between two or more items and, unless explicitly stated otherwise, is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example. Further, all references to one or more embodiments or examples are to be construed as non-limiting to the claims.

Throughout this application, the term "about" is used to indicate that a value includes the inherent variation of error for a composition/apparatus/device, the method being employed to determine the value, or the variation that exists among the study subjects. For example, but not by way of limitation, when the term "about" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps. For example, a process, method, article, or apparatus that comprises a list of elements is not necessarily limited to only those elements but may include other elements not expressly listed or inherently present therein.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

As used herein, the term "patient" or "subject" is meant to include all organisms, whether alive or dead, including any species having soft tissues and bones. For example, a system according to the inventive concepts disclosed herein may be applied to the skin of a living human, horse, cow, sheep, cat, dog, and the like.

Certain non-limiting embodiments of the present disclosure are directed to a clamping grommet for use with a combined external fixation and negative pressure wound therapy system. The clamping grommet includes an upper clamping component and a lower clamping component. The lower clamping component has an upper surface, a lower surface, and a sidewall having an outer peripheral surface, as well as first and second openings that each extend through the sidewall from the upper surface to the lower surface. The first opening allows the lower clamping component to be permanently or releasably secured about a first portion of a percutaneous device, and the second opening allows air to pass through the lower clamping component. The upper clamping component has an upper surface, a lower surface, and a sidewall having an outer peripheral surface, as well as first and second openings that each extend through the sidewall from the upper surface to the lower surface. The first opening allows the upper clamping component to be permanently or releasably secured about a second portion of the percutaneous device, and the second opening comprises a vacuum attachment connector for releasably securing a vacuum to the upper clamping component. The lower surface of the upper clamping component and the upper surface of the lower clamping component are designed to contact a negative pressure wound dressing that has an opening through which the percutaneous device extends. The upper clamping component and the lower clamping component are secured about the percutaneous device such that a seal is formed about a portion of the negative pressure wound dressing that contains the opening through which the percutaneous device extends.

In certain non-limiting embodiments, the upper surface of the lower clamping component comprises a first mating component, while the lower surface of the upper clamping component comprises a second mating component. The first and second mating components interact with one another so as to lock the upper clamping component in place about the lower clamping component and form the seal about the portion of the negative pressure wound dressing that contains the opening through which the percutaneous device extends In certain non-limiting embodiments, the clamping grommet further includes a first locking device and/or a second locking device. When present, the first locking device is disposed about the percutaneous device above the upper clamping component and permanently or releasably secures the upper clamping component in place about the percutaneous device; as such, the first locking device ensures that a seal is formed about the opening in the negative pressure wound dressing through which the percutaneous device extends. When present, the second locking device is disposed about the percutaneous device below the lower clamping component and permanently or releasably secures the lower clamping component in place about the percutaneous device; as such, the second locking device ensures that a seal is formed about the opening in the negative pressure wound dressing through which the percutaneous device extends.

In certain non-limiting embodiments, the upper clamping component further comprises a flange that extends at a substantially perpendicular angle from the upper surface of the upper clamping component. When the flange is present, the first and second openings of the upper clamping component can extend through the flange; alternatively, the first and second openings may be disposed through a different portion of the upper clamping component than the portion from which the flange extends.

In certain non-limiting embodiments, the clamping grommet further includes an O-ring for placement upon an upper surface of the wound dressing and below the upper clamping component. The O-ring frictionally and securely engages the outer peripheral surface of the percutaneous device and further enhances formation of a seal about the opening in the wound dressing through which the percutaneous device extends.

The individual components of the clamping grommet (i.e., the upper and lower clamping components and optionally the two locking devices and/or O-ring) disclosed herein may be formed of any material(s) and in any manner that will allow the clamping grommet to function in accordance with the present disclosure. In certain non-limiting embodiments, at least a portion of one or more individual components of the clamping grommet is formed of at least one substantially rigid material, such as (but not limited to) a metallic material, a polymeric material, or a combination thereof. In certain non-limiting embodiments, at least two of the components of the clamping grommet are formed of the same material. In a particular (but non-limiting) embodiment, all components of the clamping grommet are formed of the same material. In an alternative embodiment, at least two or more components of the clamping grommet are formed of different materials.

Certain non-limiting embodiments of the present disclosure are further directed to a kit that includes one or more of any of the clamping grommets described herein above or otherwise contemplated herein in combination with a wound dressing (such as, but not limited to, a negative pressure wound dressing (i.e., a vacuum sheet and/or plastic sheeting) for sealing about a wound of a subject). In a particular (but non-limiting) embodiment, the wound dressing is constructed in a manner that will allow for puncturing of the wound dressing to form an opening for insertion of at least one percutaneous device therethrough. Alternatively, the wound dressing may be provided with an opening formed therein.

The wound dressing present in the kit may be in any form that allows the kit to function in accordance with the present disclosure. For example (but not by way of limitation), the wound dressing may be provided in one or more single sheets, or a roll of wound dressing that contains multiple sections of individual wound dressing may be provided in the kit.

Certain non-limiting embodiments of the present disclosure are further directed to a kit that includes one or more of any of the clamping grommets described herein above or otherwise contemplated herein in combination with one or more percutaneous devices for use therewith. The at least one percutaneous device has a first end, a second end, and an outer peripheral surface. The second end of the at least one percutaneous device is designed for insertion through a skin and into soft tissue and/or a bone of a subject, and the first end is designed to extend above the skin of the subject.

The terms "percutaneous device" and "external fixation member" are used herein interchangeably and refer to any device that is capable of being fixated within a patient (i.e., capable of being inserted through the skin and tissue of a patient and into a bone thereof). Non-limiting examples of percutaneous devices that may be utilized in accordance with the present disclosure include pins, screws, and wires. These percutaneous devices may be formed of metallic, polymeric, and/or biodegradable materials. In addition, at least a portion of each of the percutaneous devices is formed of a substantially rigid material.

Certain non-limiting embodiments of the present disclosure are further directed to a kit that includes: (a) one or more of any of the clamping grommets described herein above or otherwise contemplated herein; (b) one or more of any of the percutaneous devices described herein above or otherwise contemplated herein; and (c) one or more of any of the wound dressings described or otherwise contemplated herein.

Certain non-limiting embodiments of the present disclosure are further directed to a kit that includes a clamping grommet for use with a negative pressure wound therapy system (i.e., a clamping grommet similar to that disclosed herein above but solely for use in a negative pressure wound therapy system and without the presence of a percutaneous device). The clamping grommet includes a lower clamping component and an upper clamping component. The lower clamping component has an upper surface, a lower surface, and an opening extending therethrough that allows air to pass through the lower clamping component; in addition, the upper surface of the lower clamping component comprises a first mating component. The upper clamping component has an upper surface, a lower surface, and an opening extending therethrough that comprises a vacuum attachment connector for releasably securing a vacuum to the upper clamping component; in addition, the lower surface of the upper clamping component comprises a second mating component. The lower surface of the upper clamping component and the upper surface of the lower clamping component are designed to contact a negative pressure wound dressing therebetween, and the first and second mating components are designed to interact with one another so as to lock the upper clamping component in place about the lower clamping component and form a seal about the portion of the negative pressure wound dressing to which a vacuum is attached.

In certain non-limiting embodiments, any of the kits of the present disclosure may further include at least one of an O-ring, a first locking device, and a second locking device.

The relative numbers and amounts of clamping grommets, percutaneous devices, wound dressings, and/or additional components/reagents present in the various kits of the present disclosure can vary widely. Also, when a plurality of clamping grommets are present, each component of each clamping grommet may have the same shape and/or size as the same components of the other clamping grommets. Alternatively, when multiple clamping grommets are present, the upper clamping components, lower clamping components, locking devices, and/or O-rings may have different shapes and/or sizes than the other components of the same type. Likewise, when multiple percutaneous devices are present, the percutaneous devices may have the same shape and/or size, or the percutaneous devices may have different shapes and/or sizes. Similarly, when multiple wound dressings are present, the wound dressings may have the same shape and/or size, or the wound dressings may have different shapes and/or sizes.

Each component of the various kits of the present disclosure may be provided in sterile form, and the kit may be sealed in a manner so as to maintain the sterility of the individual components until ready for use.

In addition, any of the kits disclosed herein can further include a set of written instructions explaining how to use the kit. A kit of this nature can be used in any of the systems and methods described or otherwise contemplated herein.

Certain non-limiting embodiments of the present disclosure are further directed to an assembly that includes any of the clamping grommets described or otherwise contemplated herein in combination with any of the percutaneous devices described or otherwise contemplated herein, and/or any of the wound dressings described or otherwise contemplated herein. The clamping grommet may be connected to the percutaneous device and/or wound dressing in the manner described in greater detail herein.

Certain non-limiting embodiments of the present disclosure are directed to a combined external fixation and negative pressure wound therapy system. The system includes one or more of any of the clamping grommets described or otherwise contemplated herein, one or more of any of the percutaneous devices described or otherwise contemplated herein, and one or more of any of the wound dressings described or otherwise contemplated herein. In the system, the at least one percutaneous device is inserted through the wound dressing at an insertion site therein, and the upper clamping component is permanently or releasably secured about the percutaneous device above the wound dressing while the lower clamping component is permanently or releasably secured about the percutaneous device below the wound dressing; in this manner, the upper and lower clamping components form a substantial seal about a portion of the wound dressing that contains the insertion site through which the at least one percutaneous device extends.

In certain non-limiting embodiments, each of the upper clamping component and the lower clamping component (as well as the first locking device, the second locking device, and the O-ring, if present) is independently permanently or releasably secured about the percutaneous device.

In certain non-limiting embodiments, the secured clamping grommet does not extend to the second end of the percutaneous device.

Certain non-limiting embodiments of the present disclosure are directed to a method of forming a combined external fixation and negative pressure wound therapy system about a wound site of a patient. The method comprises the steps of: (1) inserting at least one of any of the percutaneous devices disclosed or otherwise contemplated herein through an area of skin of the patient in the vicinity of the wound site; (2) securing (either permanently or releasably) any of the lower clamping components disclosed or otherwise contemplated herein to a portion of the percutaneous device that extends above the skin of the patient, wherein the percutaneous device is inserted through the first opening of the lower clamping component (and wherein step (2) may be performed before or after step (1), as described in greater detail herein); (3) inserting the percutaneous device through any of the negative pressure wound dressings disclosed or otherwise contemplated herein to provide an insertion site therethrough (wherein the insertion site may be preformed, or wherein the step may further include forming an opening via the insertion of the percutaneous device to provide the insertion site); (4) placing the negative pressure wound dressing about the wound site and the area of skin through which the percutaneous device is inserted to seal the negative pressure wound dressing thereabout; (5) placing any of the upper clamping components disclosed or otherwise contemplated herein about a portion of the percutaneous device extending above the negative pressure wound dressing, wherein the upper clamping component is placed about the percutaneous device such that the percutaneous device extends through the first opening thereof; (6) securing the upper clamping component to the negative pressure wound dressing and the lower clamping component so as to form a substantial seal about a portion of the negative pressure wound dressing containing the insertion site through which the percutaneous device extends; (7) attaching a vacuum to the vacuum attachment connector of the upper clamping component to form a combined external fixation and negative pressure therapy system; and (8) applying a vacuum to the system to create a negative pressure environment about the wound site and the at least one percutaneous device insertion site.

In certain non-limiting embodiments, in step (6), the upper surface of the lower clamping component comprises a first mating component and the lower surface of the upper clamping component comprises a second mating component. In addition, the first and second mating components interact with one another so as to lock the upper clamping component in place about the lower clamping component and form the seal about the portion of the negative pressure wound dressing that contains the insertion site through which the percutaneous device extends.

In certain non-limiting embodiments, the upper clamping component is secured via a locking device in step (6) above.

In certain non-limiting embodiments, the lower clamping component is secured via a locking device in step (2) above.

In certain non-limiting embodiments, the method further includes the step of disposing an O-ring upon the upper surface of the wound dressing about the insertion point of the percutaneous device therethrough.

Figure 1:
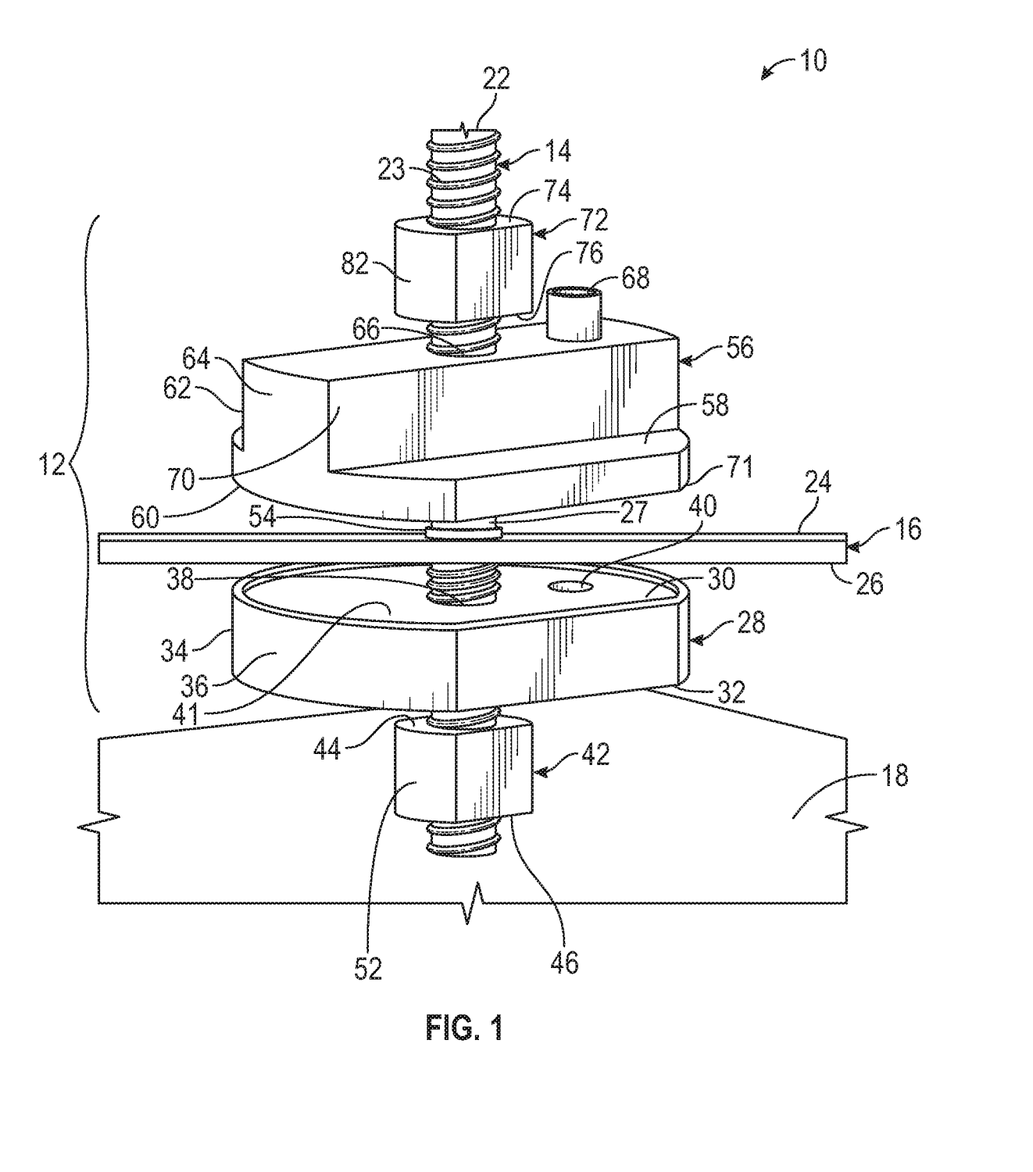
FIG. 1 is a perspective view of a combined external fixation and negative pressure wound therapy system constructed in accordance with the present disclosure, with a wound dressing and the skin/tissue/bone of a patient shown in a cross-sectional view.

Turning now to the Drawings, FIG. 1 illustrates a combined external fixation and negative pressure wound therapy system or assembly 10. The assembly 10 comprises a clamping grommet 12, a percutaneous device 14 (such as, but not limited to, a rod), and a wound dressing 16 for sealing about a wound of a subject (such as, but not limited to, a negative pressure wound dressing). A first end 20 (FIG. 8) of the percutaneous device 14 is inserted through the wound dressing 16 (thereby forming an insertion site 27 in the wound dressing 16) and further into skin/tissue/bone 18 of a patient for use in a manner well known in the art, while a second end 22 of the percutaneous device 14 extends above the skin/tissue/bone 18 of the patient. The clamping grommet 12 is then disposed about an outer peripheral surface 23 of a portion of the percutaneous device 14 that extends above the skin/tissue/bone 18.

The clamping grommet 12 comprises a lower clamping component 28 and an upper clamping component 56. A portion of the wound dressing 16 that includes the insertion site 27 through which the percutaneous device 14 extends is disposed in between the upper and lower clamping components 28 and 56, respectively, in a manner described in greater detail herein after. The upper and lower clamping components 28 and 56 are then permanently or releasably secured about the percutaneous device 14 and the wound dressing 16 so as to form a substantial seal about the portion of the wound dressing 16 containing the insertion site 27 through which the percutaneous device 14 extends.

The upper and lower clamping components 28 and 56 may be provided with any structural features that allow the upper and lower clamping components to mate with one another and form the substantial seal about the portion of the wound dressing 16 disposed therebetween. In addition, these mating elements serve to distribute the tension and seal across the section of the wound dressing 16 disposed between the upper and lower clamping components 28 and 56 (as opposed to simply forming a seal about the insertion site 27) and thus decrease the risk of any tearing of the wound dressing 16 around the insertion site 27. Such structural features will be described in greater detail herein below with reference to FIGS. 2-7.

Figure 2:
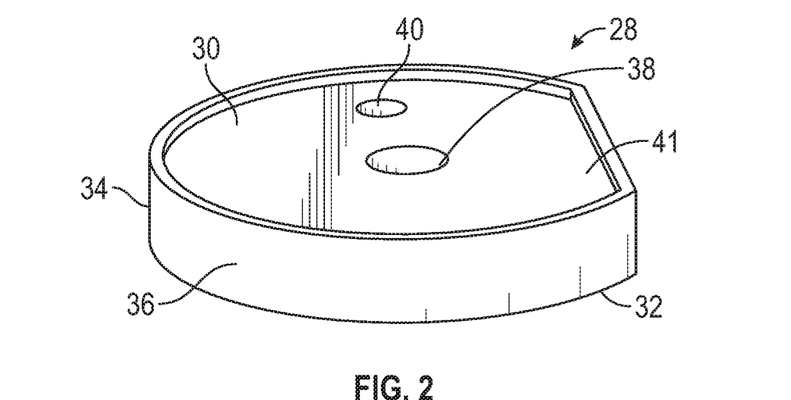
FIG. 2 is a perspective view of a lower clamping component of a clamping grommet constructed in accordance with the present disclosure.
Figure 3:
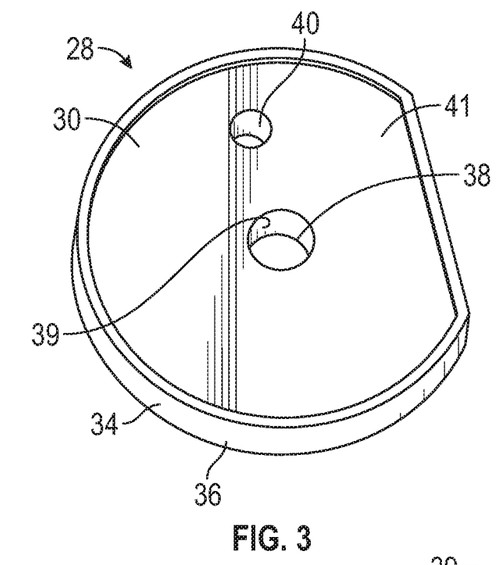
FIG. 3 is a top plan view of the lower clamping component of FIG. 2.
Figure 4:
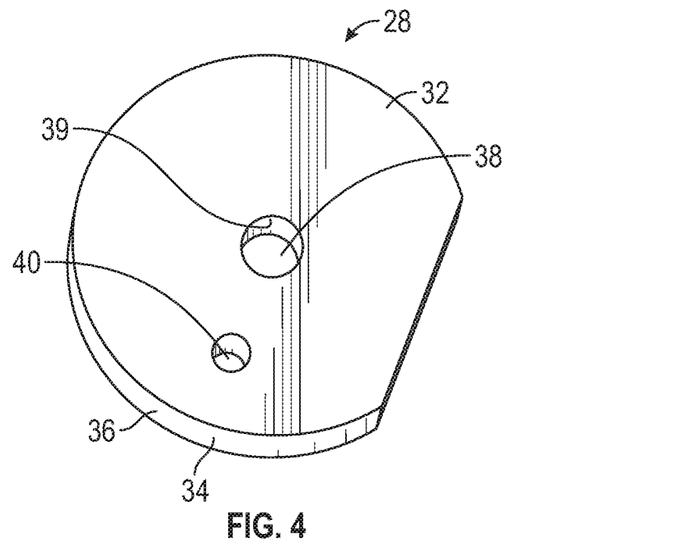
FIG. 4 is a lower plan view of the lower clamping component of FIG. 2.

FIGS. 2-4 illustrate the lower clamping component 28, which has an upper surface 30, a lower surface 32, and a sidewall 34 that has an outer peripheral surface 36. The lower clamping component 28 also includes a first opening 38 and a second opening 40 that extend through the sidewall 34 from the upper surface 30 to the lower surface 32 thereof. The first opening 38 is sized and dimensioned so that at least a portion of the percutaneous device 14 can be inserted therethrough so that the percutaneous device 14 extends through the lower clamping component 28, and the lower clamping component 28 can be permanently or releasably secured about a first portion of the outer peripheral surface 23 of the percutaneous device 14. The second opening 40 allows air to pass through the lower clamping component 28.

The lower clamping component 28 may be formed of any materials disclosed or otherwise contemplated herein and may be provided with any size and/or dimension that allows the lower clamping component 28 to include the first and second openings 38 and 40 extending therethrough, to interact with the other components of the clamping grommet 12 as described herein, and to be able to function in accordance with the present disclosure. As such, the structure shown in FIGS. 2-4 is for purposes of illustration only. In particular, the partially cylindrical shape in combination with a planar section is solely for purposes of illustration only and should not be considered limiting; the lower clamping component 28 may assume any shape (including, but not limited to, cube, cuboid, conical, or frustoconical shapes, any combination of one or more shapes, etc.) so long as the shape will allow the lower clamping component 28 to function in accordance with the present disclosure.

Figure 5:
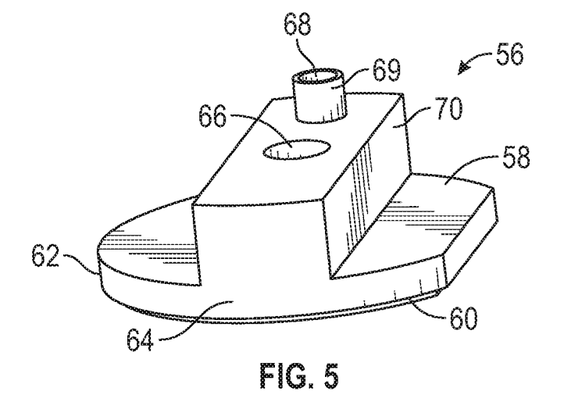
FIG. 5 is a perspective view of an upper clamping component of a clamping grommet constructed in accordance with the present disclosure.
Figure 6:
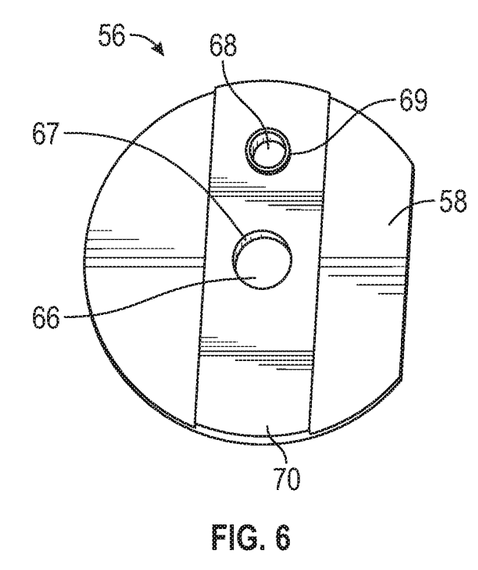
FIG. 6 is a top plan view of the upper clamping component of FIG. 5.
Figure 7:
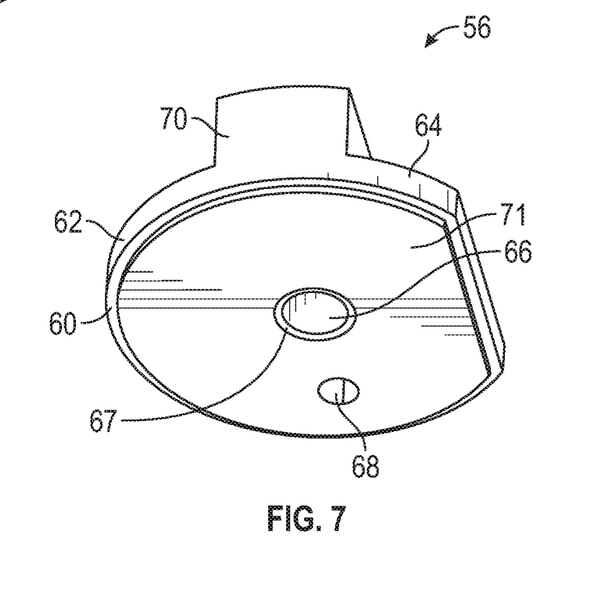
FIG. 7 is a lower plan view of the upper clamping component of FIG. 5.

FIGS. 5-7 illustrate the upper clamping component 56, which has an upper surface 58, a lower surface 60, and a sidewall 62 that has an outer peripheral surface 64. The upper clamping component 56 also includes a first opening 66 and a second opening 68 that extend through the sidewall 62 from the upper surface 58 to the lower surface 60 thereof. The first opening 66 is sized and dimensioned so that at least a portion of the percutaneous device 14 can be inserted therethrough so that the percutaneous device 14 extends through the upper clamping component 56, and the upper clamping component 56 can be permanently or releasably secured about a second portion of the outer peripheral surface 23 of the percutaneous device 14. The second opening 68 is provided with a vacuum attachment connector 69 for releasably securing a vacuum to the upper clamping component 56. The vacuum attachment connector 69 may optionally comprise a structure that extends above the second opening 68, as depicted in FIGS. 5-6, or the vacuum attachment connector 69 may simply be formed from a portion of the second opening 68.

The placement of the vacuum attachment connector 69 upon the upper clamping component 56 provides another important advantage of the presently disclosed combined therapy system over the prior art. By having the vacuum attached in close proximity to the insertion site of the percutaneous device 14 into the skin/tissue/bone 18 of the patient, the negative pressure therapy is established in the immediate vicinity of the percutaneous device insertion site into the skin/tissue/bone 18 of the patient; as such, the risk of pin tract infection occurrence and severity at the percutaneous device insertion site will be reduced, thereby providing a method of substantially preventing the most common complication of external fixation.

The upper clamping component 56 may be formed of any materials disclosed or otherwise contemplated herein and may be provided with any size and/or dimension that allows the upper clamping component 56 to include the first and second openings 66 and 68 extending therethrough, to interact with the other components of the clamping grommet 12 as described herein, and to be able to function in accordance with the present disclosure. As such, the structure shown in FIGS. 5-7 is for purposes of illustration only. In particular, the partially cylindrical shape in combination with a planar section is solely for purposes of illustration only and should not be considered limiting; the upper clamping component 56 may assume any shape (including, but not limited to, cube, cuboid, conical, or frustoconical shapes, any combination of one or more shapes, etc.) so long as the shape will allow the upper clamping component 56 to function in accordance with the present disclosure.

In certain non-limiting embodiments, the upper clamping component 56 may further include a flange 70 that extends at a substantially perpendicular angle from the upper surface 58 of the upper clamping component 56. For example, the flange 70 may assist in positioning and placement of the upper clamping component 56 about the percutaneous device 14.

When a flange 70 is present, the first and/or second openings 66 and 68, respectively, may extend through the flange 70, as shown in FIGS. 5-7. Alternatively, the first and/or second openings 66 and 68, respectively, may extend from a portion of the upper surface 58 of the upper clamping component 56 that is separate from the flange 70.

When a flange 70 is present, the flange 70 may assume any size and/or shape that allows the flange 70 to function in accordance with the present disclosure. Further, the flange 70 may extend from any portion of (and at any angle from) the upper clamping component 56. Thus, the structure depicted in FIGS. 5-7 is for purposes of example only.

The upper and lower clamping components 28 and 56 are each provided with a mating component that allows the upper and lower clamping components 28 and 56 to mate with one another and form the substantial seal about the insertion site 27 of the wound dressing 16 disposed therebetween. For example, but not by way of limitation, the lower clamping component 28 is depicted in FIGS. 2-4 as including a first mating component (i.e., a recess 41) in a portion of the upper surface 30 thereof that is sized and dimensioned to mate with a second mating component (i.e., a protrusion 71) that extends from the lower surface 60 of the upper clamping component (as shown in FIGS. 5-7). In particular, the protrusion 71 has a partially cylindrical shape in combination with a planar section, while the recess 41 has an inverted shape that mirrors the shape of the protrusion 71; in this manner, the contact of the planar section of the protrusion 71 with the planar section of the recess 41 ensures that the upper and lower clamping components 56 and 28 lock together and do not slide across the wound dressing 16. In this manner, these first and second mating components (i.e., the recess 41 and the protrusion 71) serve to distribute the tension and seal across the entire section of the wound dressing 16 disposed between the upper and lower clamping components 28 and 56 and thus decrease the risk of any tearing of the wound dressing 16 around the insertion site 27 of the percutaneous device 14.

In addition, the locking feature of the first and second mating components ensures that the second opening 40 of the lower clamping component 28 is substantially aligned with the second opening 68 of the upper clamping component 56.

While particular structures (i.e., the recess 41 and the protrusion 71) are shown as the first and second mating components, it will be understood that the mating components may assume any size, shape, and dimension, so long as the second mating component disposed on the lower surface 60 of the upper clamping component 28 is an inverted mirror image of and can mate with the first mating component disposed on the upper surface 30 of the lower clamping component 28. Further, while the upper surface 30 of the lower clamping component 28 is depicted as containing the recess 41 that mates with the protrusion 71 on the lower surface 60 of the upper clamping component 28, it will be understood that this combination is for purposes of illustration only; in an alternative embodiment of the present disclosure, the lower surface 60 of the upper clamping component 28 may be provided with a recess that mates with a protrusion that extends from the upper surface 30 of the lower clamping component 28.

Figure 8:
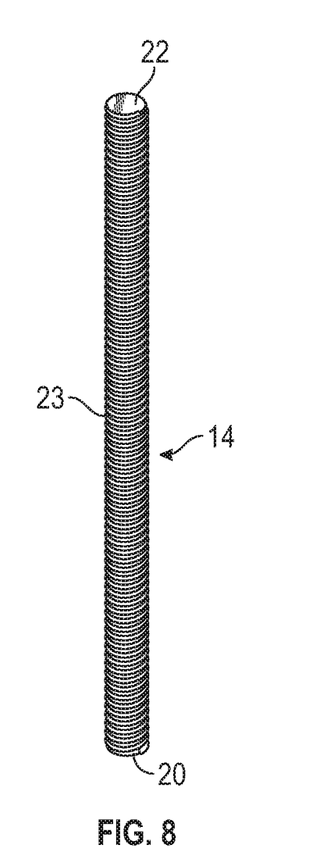
FIG. 8 is a perspective view of a percutaneous device for use with the clamping grommet of the present disclosure.

FIG. 8 illustrates a percutaneous device 14, which includes a first end 20, a second end 22, and an outer peripheral surface 23. The first end 20 is designed for insertion into skin/tissue/bone of a patient, while the second end 22 is designed to extend above the skin of the patient for use in various traction pinning/external fixation mechanisms.

Figure 9:
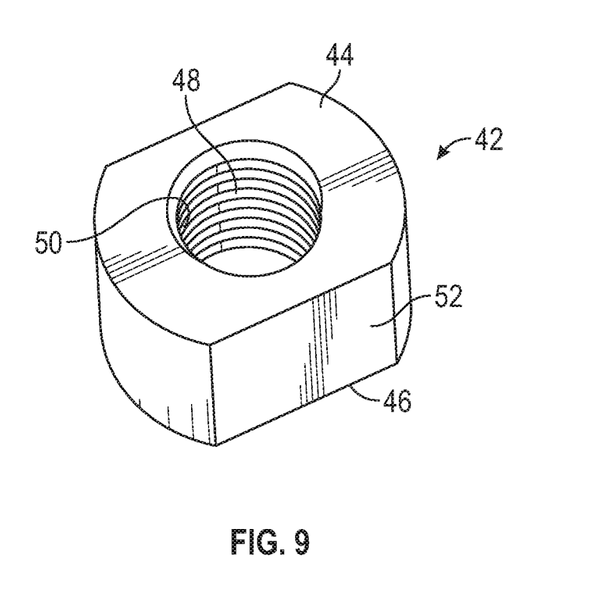
FIG. 9 is a perspective view of an optional locking device of the clamping grommet of the present disclosure.

FIG. 9 illustrates a locking device 42 (such as, but not limited to, a locking nut) that may be used with the lower clamping component 28 for permanently or releasably securing the lower clamping component 28 about a percutaneous device 14. The locking device 42 includes an upper surface 44, a lower surface 46, and a sidewall having an outer peripheral surface 52. The locking device 42 further includes an opening 48 that defines an inner peripheral surface 50 of the locking device 42, and the opening 48 extends from the upper surface 44 to the lower surface 46 thereof. The locking device 42 is sized and dimensioned so as to frictionally engage the outer peripheral surface 23 of the percutaneous device 14 so as to maintain the locking device 42 in a secure position about the percutaneous device 14.

The locking device 42 may be formed of any materials disclosed or otherwise contemplated herein and may be provided with any size and/or dimension that allows the locking device to frictionally engage and be maintained in a secure position about the outer peripheral surface 23 of the percutaneous device 14. As such, the structure shown in FIG. 9 is for purposes of illustration only.

The inner peripheral surface 50 of the opening 48 of the locking device 42 may be provided with any mechanism that allows the locking device 42 to frictionally engage the outer peripheral surface 23 of the percutaneous device 14 and thus maintain the locking device 42 in a secure position about the percutaneous device 14. For purposes of illustration only, the inner peripheral surface 50 is depicted in FIG. 9 as being threaded for this purpose; however, the inner peripheral surface 50 of the locking device 42 may be provided with any other mechanism(s) known in the art or otherwise contemplated herein that will provide the frictional engagement/secure locking mechanism to the locking device 42;

thus, the depiction of threading in FIG. 9 is for purposes of illustration only and should not be construed as limiting.

While only the locking device 42 is shown in FIG. 9, it will be understood that the locking device 72 utilized with the upper clamping component 56 is identical in construction and function to any of the locking devices 42 described herein. In addition, two identical locking devices may be utilized together as the locking devices 42 and 72 in the assembly 10; alternatively, two different embodiments of locking devices described or otherwise contemplated herein may be utilized as the locking devices 42 and 72 in the assembly 10. That is, the locking device 42 may be larger or smaller in length, width, and/or height than the locking device 42, and/or the locking device 42 may have a different shape than the locking device 72. The only requirement is that the two locking devices 42 and 72 can function together to permanently or releasably secure the upper and lower clamping components 56 and 28, respectively, about the outer peripheral surface 23 of the percutaneous device 14 and the insertion site 27 in the wound dressing 16 and form a substantial seal thereabout.

While the assembly 10 of FIG. 1 is depicted as including two locking devices 42 and 72 in combination with the upper and lower clamping components 56 and 28, respectively, it will be understood that the assembly 10 can also be formed in the absence of one or both of these locking devices. For example, the upper and/or lower clamping components 56 and 28 may each be provided with a portion thereof that will secure the clamping component about the percutaneous device 14. That is, an inner peripheral surface of the first opening 38 of the lower clamping component 28 and/or an inner peripheral surface of the first opening 66 of the upper clamping component 56 may be sized and dimensioned so as to frictionally engage an outer peripheral surface of the percutaneous device 14 so as to maintain the upper and/or lower clamping component 56 or 28 in a secure position about the percutaneous device 14. In a particular (but non-limiting) example, an inner peripheral surface of the first opening 38 of the lower clamping component 28 and/or an inner peripheral surface of the first opening 66 of the upper clamping component 56 may be threaded in a similar manner to that described above for the inner peripheral surface 50 of the locking device 42, to further enhance securing the upper clamping component 56 about the percutaneous device 14. Alternatively, the inner peripheral surface of the first opening 38 of the lower clamping component 28 and/or the inner peripheral surface of the first opening 66 of the upper clamping component 56 may be provided with another locking mechanism that functions to secure the upper clamping component 56 about the percutaneous device 14.

Figure 10:
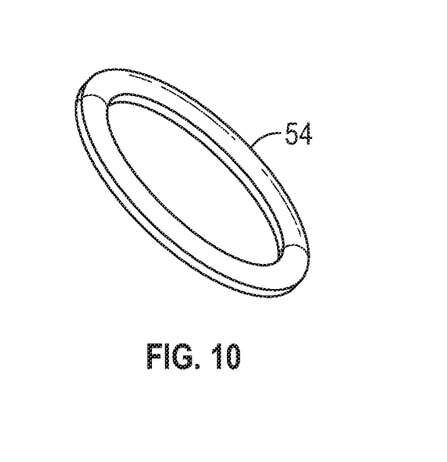
FIG. 10 is a perspective view of an optional O-ring of the clamping grommet of the present disclosure.

In one non-limiting alternative embodiment, the assembly 10 may further include an O-ring 54 (FIGS. 1 and 10) for placement upon the upper surface 24 of the wound dressing 16 about the insertion site 27 through which the percutaneous device extends and below the lower surface 60 of the upper clamping component 56, to further enhance the seal of the insertion site 27 of the wound dressing 16 about the percutaneous device 14.

Figure 11:
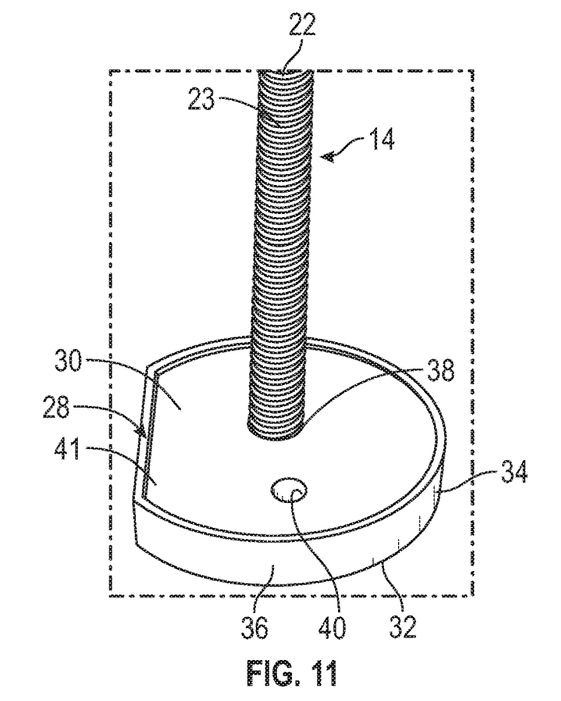
FIG. 11 is a perspective view of a lower clamping component of a clamping grommet disposed about a percutaneous device.

FIGS. 11-14 illustrate the use of a combined negative pressure wound therapy and external fixation system that comprises the assembly 10. In FIG. 11, the percutaneous device 14 is inserted through the first opening 38 of the lower clamping component 28 such that the lower clamping component is placed at a desired position on the percutaneous device 14. Either before or after placement of the lower clamping component 28 thereon, the first end 20 of the percutaneous device 14 is inserted into a patient's skin/tissue/bone 18 for use in an external fixation system. The lower clamping component 28 disposed on the percutaneous device is then positioned at a desired height above (and optionally adjacent) the skin 18 of the patient. When the first end 20 of the percutaneous device 14 is inserted into the patient's skin/tissue/bone 18 prior to placement of the lower clamping component 28, then the second end 22 of the percutaneous device 14 is inserted through the first opening 38 of the lower clamping component 28.

In certain non-limiting embodiments, the lower clamping component 28 and the percutaneous device 14 may be provided pre-assembled. In a particular (but non-limiting) embodiment, the lower clamping component 28 may even be integrally formed or manufactured as part of (and/or permanently attached to) the percutaneous device 14.

When utilized, the locking device 42 may be positioned on the percutaneous device 14 prior to or following placement of the lower clamping component 28 and disposed on the percutaneous device 14 at a position above (and optionally adjacent) the skin 18 of the patient. Then the lower clamping component 28 is positioned on the percutaneous device 18 such that the upper surface 44 of the locking device 42 contacts the lower surface 32 of the lower clamping component 28. Alternatively, in a particular (but non-limiting) embodiment, the locking device 42 and percutaneous device 14 (and optionally the lower clamping component 28 as well) may be pre-assembled, or the locking device 42 may even be integrally formed or manufactured as part of (and/or permanently attached to) the percutaneous device 14.

In the absence of the locking device 42 (and in the absence of integral formation/manufacture of the lower clamping component 28 and the percutaneous device 14), the first opening 38 in the lower clamping component 28 may be provided with a locking/securing mechanism for permanently or releasably securing the lower clamping component 28 in a desired position about the percutaneous device 14 so that the locking device 42 is not required.

Figure 12:
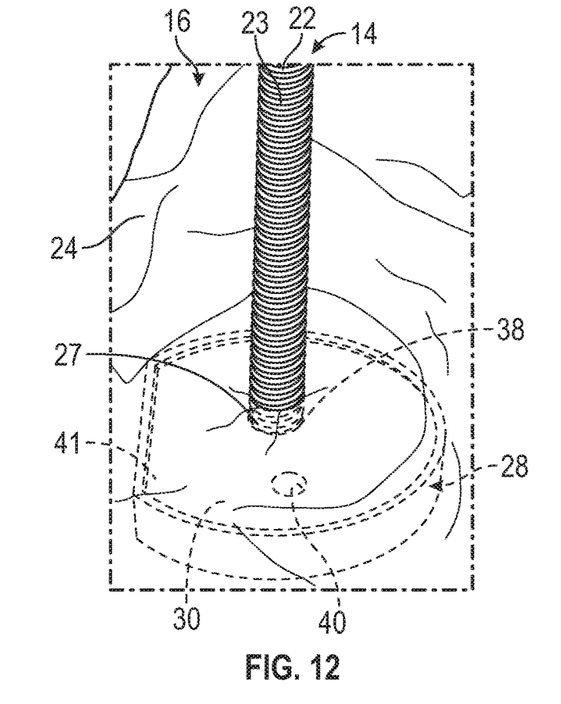
FIG. 12 is a perspective view of the lower clamping component and percutaneous device of FIG. 11 in combination with a wound dressing.

After permanently or releasably securing the lower clamping component 28 in the desired placement with respect to the percutaneous device 14 and the patient's skin 18, an opening is provided or formed in the wound dressing 16 (i.e., the percutaneous device 14 pierces a hole in the wound dressing 16) so that the wound dressing 16 can be disposed over the second end 22 of the percutaneous device 14 and disposed at a position whereby the lower surface 26 of the wound dressing 16 contacts the upper surface 30 of the lower clamping component 28 (FIG. 12). Then the upper clamping component 56 is disposed over the second end 22 of the percutaneous device 14 (FIG. 13) and positioned on the percutaneous device 14 such that the lower surface 60 of the upper clamping component 56 contacts the upper surface 24 of the wound dressing 16 (FIG. 14) and is disposed substantially adjacent the upper surface 30 of the lower clamping component 28.

Figure 13:
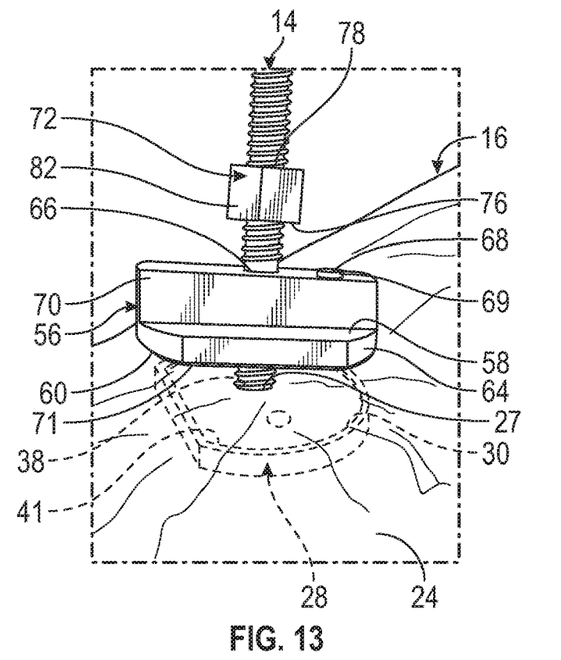
FIG. 13 is a perspective view of a partially assembled clamping grommet in combination with a percutaneous device and wound dressing.
Figure 14:
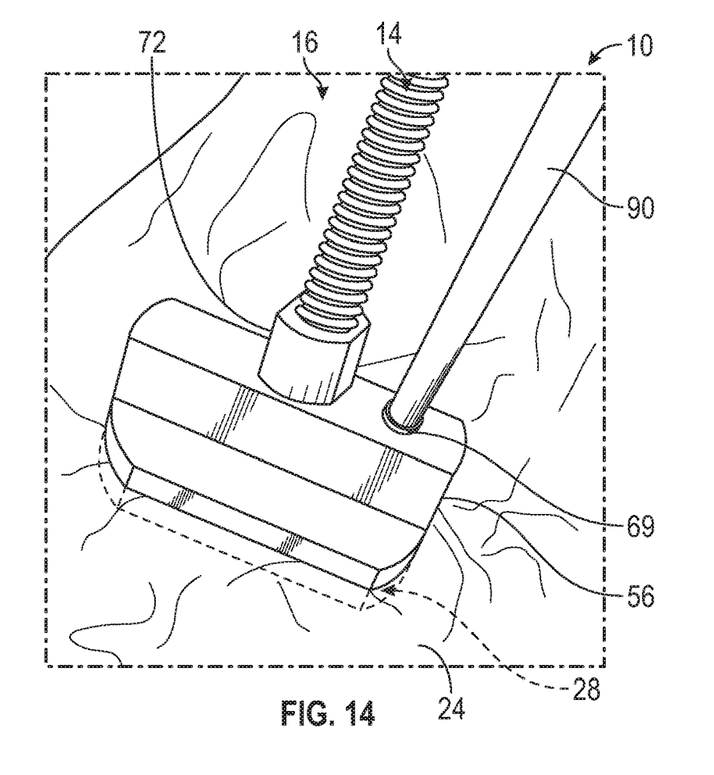
FIG. 14 is a perspective view of an external fixation and negative pressure wound therapy system that includes the fully assembled clamping grommet of FIG. 13.

In certain non-limiting embodiments, the first opening 66 in the upper clamping component 56 may be provided with a locking/securing mechanism for permanently or releasably securing the upper clamping component 56 in a desired position about the outer peripheral surface of the percutaneous device 14 so that the locking device 72 is not required. Alternatively, following placement of the upper clamping component 56, the locking device 72 may be disposed over the second end 22 of the percutaneous device 14 and disposed at a position whereby the lower surface 76 of the locking device 72 contacts the upper surface 58 of the upper clamping component 56 and permanently or releasably secures the clamping grommet 12 (comprising the upper and lower clamping components 56 and 28 and optionally the locking devices 42 and/or 72) in place about the wound dressing 16 and the percutaneous device 14 such that a substantial seal is formed about the opening in the wound dressing 16 through which the percutaneous device 14 extends.

Further, in order to establish the negative pressure wound therapy system, the wound dressing 16 is sealed to the patient's skin 18 in a manner that surrounds at least a portion (or all) of the wound, and a vacuum tubing 90 or other device is attached to the vacuum attachment connector 69 of the upper clamping component 56 (FIG. 14). Upon application of a vacuum via the attached vacuum tubing 90, an area of negative pressure is created and maintained under the wound dressing 16 in the area of the wound, while the external fixation system comprising the percutaneous device 14 remains in place and does not substantially interfere with the negative pressure system.

While the clamping grommets depicted in the Figures contain two openings (one for a percutaneous device and one for establishing the negative pressure wound therapy system), it will be understood that the clamping grommets of the present disclosure can also be used in the absence of an external fixation system. That is, the clamping grommets can simply serve as a secure connection point for connecting the vacuum tubing to the wound dressing. Also, the first and second mating components of the lower and upper clamping components of the clamping grommets serve to distribute the tension and seal across the entire section of the wound dressing disposed therebetween and thus decrease the risk of any tearing around the opening in the wound dressing through which the vacuum is established. Thus, clamping grommets that function in this manner also fall within the scope of the present disclosure.

Thus, in accordance with the present disclosure, there have been provided devices, assemblies, and kits, as well as methods of producing and using same, which fully satisfy the objectives and advantages set forth hereinabove. Although the present disclosure has been described in conjunction with the specific drawings, experimentation, results, and language set forth hereinabove, it is evident that many alternatives, modifications, and variations will be apparent to those skilled in the art. Accordingly, it is intended to embrace all such alternatives, modifications, and variations that fall within the spirit and broad scope of the present disclosure.

What is claimed is:

1. A kit, comprising:
    a clamping grommet for use with a combined external fixation and negative pressure wound therapy system, the clamping grommet comprising:
        a lower clamping component having an upper surface and a lower surface, the lower clamping component having first and second openings extending therethrough, wherein the first opening allows the lower clamping component to be permanently or releasably secured about a first portion of a percutaneous orthopedic device configured to extend through a skin of a patient and into a bone of the patient, and wherein the second opening allows air to pass through the lower clamping component;
        an upper clamping component having an upper surface and a lower surface, the upper clamping component having first and second openings extending therethrough, wherein the first opening allows the upper clamping component to be permanently or releasably secured about a second portion of the percutaneous orthopedic device, and wherein the second opening comprises a vacuum attachment connector for releasably securing a vacuum to the upper clamping component; and
        wherein the lower surface of the upper clamping component and the upper surface of the lower clamping component are designed to contact a negative pressure wound dressing that has an opening through which the percutaneous orthopedic device extends, and wherein the upper clamping component and the lower clamping component are secured about the percutaneous orthopedic device such that a seal is formed about a portion of the negative pressure wound dressing that contains the opening through which the percutaneous orthopedic device extends; and
    at least one percutaneous orthopedic device, wherein the at least one percutaneous orthopedic device comprises:
        a first end designed for insertion through a skin of a patient and into a bone of the patient;
        a second end designed to extend above the skin of the patient;
        a first portion designed to extend above the skin of the patient for permanently or releasably securing the lower clamping component to the device; and
        a second portion designed to extend above the skin of the patient for permanently or releasably securing the upper clamping component to the device.

2. The kit of claim 1, further comprising a negative pressure wound dressing for sealing about a wound of a subject, wherein the wound dressing has or is capable of having an opening extending therethrough for insertion of the at least one percutaneous orthopedic device therethrough.

3. The kit of claim 1, further comprising an O-ring.

4. The kit of claim 1, further comprising at least one locking device.

5. The kit of claim 1, wherein the at least one percutaneous orthopedic device is at least one external fixation member.

6. The kit of claim 1, wherein the upper surface of the lower clamping component of the clamping grommet comprises a first mating component and the lower surface of the upper clamping component of the clamping grommet comprises a second mating component, and wherein the first and second mating components interact with one another so as to lock the upper clamping component in place about the lower clamping component and form the seal about the portion of the negative pressure wound dressing that contains the opening through which the percutaneous orthopedic device extends.

7. The kit of claim 1, wherein the clamping grommet further comprises a locking device that is disposed about the percutaneous orthopedic device above the upper clamping component and secures the upper clamping component in place about the percutaneous orthopedic device.

8. The kit of claim 1, wherein the clamping grommet further comprises a locking device that is disposed about the percutaneous orthopedic device below the lower clamping component and secures the lower clamping component in place about the percutaneous orthopedic device.

9. The kit of claim 1, wherein the upper clamping component of the clamping grommet further comprises a flange that extends at a substantially perpendicular angle from the upper surface of the upper clamping component.

10. The kit of claim 9, wherein the first and second openings of the upper clamping component extend through the flange.

11. The kit of claim 1, wherein the clamping grommet further comprises an O-ring for placement upon an upper surface of the wound dressing and below the upper clamping component of the clamping grommet.

12. A combined external fixation and negative pressure wound therapy system, the system comprising:
   at least one clamping grommet for use with a combined external fixation and negative pressure wound therapy system, the at least one clamping grommet comprising:
      a lower clamping component having an upper surface and a lower surface, the lower clamping component having first and second openings extending therethrough, wherein the first opening allows the lower clamping component to be permanently or releasably secured about a first portion of a percutaneous orthopedic device configured to extend through a skin of a patient and into a bone of the patient, and wherein the second opening allows air to pass through the lower clamping component;
      an upper clamping component having an upper surface and a lower surface, the upper clamping component having first and second openings extending therethrough, wherein the first opening allows the upper clamping component to be permanently or releasably secured about a second portion of the percutaneous orthopedic device, and wherein the second opening comprises a vacuum attachment connector for releasably securing a vacuum to the upper clamping component; and
      wherein the lower surface of the upper clamping component and the upper surface of the lower clamping component are designed to contact a negative pressure wound dressing that has an opening through which the percutaneous orthopedic device extends, and wherein the upper clamping component and the lower clamping component are secured about the percutaneous orthopedic device such that a seal is formed about a portion of the negative pressure wound dressing that contains the opening through which the percutaneous orthopedic device extends;
   at least one percutaneous orthopedic external fixation device; and
   a negative pressure wound dressing for sealing about a wound of a subject; and
   wherein the at least one percutaneous orthopedic device is configured to be inserted through the wound dressing at an insertion site therein and through a skin and into a bone of a patient, and wherein the upper clamping component is secured about the percutaneous orthopedic device above the wound dressing while the lower clamping component is secured about the percutaneous orthopedic device below the wound dressing, and wherein the upper and lower clamping components form a substantial seal about the portion of the wound dressing containing the insertion site through which the at least one percutaneous orthopedic device extends.

13. A method of forming a combined external fixation and negative pressure wound therapy system about a wound site of a patient, the method comprising the steps of:
   (1) inserting at least one percutaneous orthopedic device through an area of skin of the patient in the vicinity of the wound site and into a bone of the patient;
   (2) securing a lower clamping component to a portion of the percutaneous orthopedic device that extends above the skin of the patient, the lower clamping component having an upper surface and a lower surface and first and second openings extending therethrough, wherein the percutaneous orthopedic device is inserted through the first opening of the lower clamping component, and wherein the second opening allows air to pass through the lower clamping component;
   (3) inserting the percutaneous orthopedic device through a negative pressure wound dressing to provide an insertion site therethrough;
   (4) placing the negative pressure wound dressing about the wound site and the area of skin through which the percutaneous orthopedic device is inserted to seal the negative pressure wound dressing thereabout;
   (5) placing an upper clamping component about a portion of the percutaneous orthopedic device extending above the negative pressure wound dressing, the upper clamping component having an upper surface and a lower surface and first and second openings extending therethrough, wherein the upper clamping component is placed about the percutaneous orthopedic device such that the percutaneous orthopedic device extends through the first opening thereof, and wherein the second opening comprises a vacuum attachment connector that extends through the upper surface of the upper clamping component;
   (6) securing the upper clamping component to the negative pressure wound dressing and the lower clamping component so as to form a substantial seal about a portion of the wound dressing containing the insertion site through which the percutaneous orthopedic device extends;
   (7) attaching a vacuum to the vacuum attachment connector of the upper clamping component to form a combined external fixation and negative pressure therapy system; and
   (8) applying a vacuum to the system to create a negative pressure environment about the wound site and the at least one percutaneous orthopedic device insertion site.

14. The method of claim 13, wherein in step (6), the upper surface of the lower clamping component comprises a first mating component and the lower surface of the upper clamping component comprises a second mating component, and wherein the first and second mating components interact with one another so as to lock the upper clamping component in place about the lower clamping component and form the seal about the portion of the negative pressure wound dressing that contains the insertion site through which the percutaneous orthopedic device extends.

15. The method of claim 13, wherein in step (6), the upper clamping component is secured via a locking device.

16. The method of claim 13, further comprising the step of disposing an O-ring upon the upper surface of the wound dressing about the insertion site of the percutaneous orthopedic device therethrough.

17. The method of claim 13, wherein the upper clamping component further comprises a flange that extends at a substantially perpendicular angle from the upper surface of the upper clamping component.

18. The method of claim 17, wherein the first and second openings of the upper clamping component extend through the flange.

19. The method of claim 13, wherein step (2) is performed before step (1).

* * * * *